US012604176B2

(12) United States Patent
Lu et al.

(10) Patent No.: US 12,604,176 B2
(45) Date of Patent: Apr. 14, 2026

(54) EMBEDDED SUBSCRIBER IDENTIFICATION MODULE WITH SECURE PROFILES

(71) Applicant: Verizon Patent and Licensing Inc., Basking Ridge, NJ (US)

(72) Inventors: Qi Lu, Round Rock, TX (US); Manuel E Caceres, Basking Ridge, NJ (US); Mun Wei Low, Irving, TX (US); Warren H Uy, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 258 days.

(21) Appl. No.: 18/345,182

(22) Filed: Jun. 30, 2023

(65) Prior Publication Data

US 2025/0008314 A1     Jan. 2, 2025

(51) Int. Cl.
*H04W 8/00* (2009.01)
*H04W 8/18* (2009.01)
*H04W 12/069* (2021.01)

(52) U.S. Cl.
CPC ......... *H04W 8/183* (2013.01); *H04W 12/069* (2021.01)

(58) Field of Classification Search
CPC ........................... H04W 8/183; H04W 12/069; H04W 455/418
See application file for complete search history.

(56) References Cited

U.S. PATENT DOCUMENTS

| | | | | |
|---|---|---|---|---|
| 2013/0231087 A1* | 9/2013 | O'Leary | ............. | H04W 12/084 |
| | | | | 455/411 |
| 2020/0351653 A1* | 11/2020 | Khan | ..................... | H04W 12/35 |
| 2021/0105626 A1* | 4/2021 | Olshinka | ............... | H04W 12/42 |
| 2022/0350752 A1* | 11/2022 | Nasser | ................ | G06F 12/1475 |
| 2023/0083018 A1* | 3/2023 | Jin | ........................ | H04W 8/205 |
| | | | | 455/418 |
| 2024/0224021 A1* | 7/2024 | An | ........................ | H04W 8/205 |

FOREIGN PATENT DOCUMENTS

| | | | | | |
|---|---|---|---|---|---|
| CN | 1795439 | A * | 6/2006 | .......... | G06F 21/126 |
| EP | 3678394 | B1 * | 10/2021 | .......... | H04L 9/3268 |
| EP | 4037357 | B1 * | 8/2023 | ............. | H04W 8/18 |

* cited by examiner

*Primary Examiner* — Khai M Nguyen

(57) ABSTRACT

An example device includes a processor, and an embedded subscriber identification module (eSIM). The eSIM includes a secure memory, and a physical memory manager configured to receive a first request to load a first profile for accessing a first mobile network in the secure memory from a first mobile network operator, and responsive to authenticating the first request, create a first partition in the secure memory associated with the first mobile network operator, store in the first partition the first profile, and limit access to the first partition to the first mobile network operator.

20 Claims, 7 Drawing Sheets

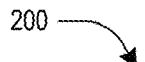

200

```
┌─────────────────────────────────────────────────────────┐
│  LOAD DIGITAL CERTIFICATES FOR MOBILE NETWORK OPERATORS  │───── 205
└─────────────────────────────────────────────────────────┘
                            │
                            ▼
┌─────────────────────────────────────────────────────────┐
│       RECEIVE REQUEST FROM MNO TO LOAD SIM PROFILE        │───── 210
└─────────────────────────────────────────────────────────┘
                            │
                            ▼
┌─────────────────────────────────────────────────────────┐
│                     VALIDATE REQUEST                      │───── 215
└─────────────────────────────────────────────────────────┘
                            │
                            ▼
┌─────────────────────────────────────────────────────────┐
│        CREATE PARTITION IN SECURE MEMORY FOR MNO          │───── 220
└─────────────────────────────────────────────────────────┘
                            │
                            ▼
┌─────────────────────────────────────────────────────────┐
│                     LOAD SIM PROFILE                      │───── 225
└─────────────────────────────────────────────────────────┘
                            │
                            ▼
┌─────────────────────────────────────────────────────────┐
│                DESIGNATE ACTIVE SIM PROFILE               │───── 230
└─────────────────────────────────────────────────────────┘
```

255 — RECEIVE REQUEST FROM MNO TO ACCESS SIM PROFILE

260 — VALIDATE REQUEST

265 — DETERMINE PARTITION ASSOCIATED WITH MNO

275 — ALLOW ACCESS

270 — AUTHORIZED PARTITION?

280 — DENY ACCESS

400

402

NON-TRANSITORY MEMORY DEVICE

404

001101 0110001 011000 0111111 0111111 0000000
00000 0111011 011110 011001 0111011 0000000

406

READING

412

PROCESSOR-
EXECUTABLE
INSTRUCTIONS

408

DEVICE

410

READER

416

PROCESSOR

EMBODIMENT

EMBEDDED SUBSCRIBER IDENTIFICATION MODULE WITH SECURE PROFILES

BACKGROUND

A universal integrated circuit card (UICC), referred to as a subscriber identification module (SIM) or SIM card, is a smart card that is often included in an electronic device (e.g., a smart phone, tablet, a smart watch, Internet of Things (IoT) device, or some other device), and used to access Global System for Mobile communications (GSM) networks, Universal Mobile Telecommunications System (UMTS) networks, Long-Term Evolution (LTE) networks, Fifth Generation (5G) networks, or some other network. For example, the UICC may securely store information used to identify and authenticate a subscriber on a wireless network associated with a particular mobile network operator (MNO). An embedded UICC (eUICC) or embedded SIM (eSIM) is a UICC that can be remotely provisioned with one or more operator profiles. Accordingly, in an electronic device with an eUICC, different operator profiles can be installed, enabled, disabled, or deleted without having to physically swap the eUICC.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIGS. 2A and 2B are flow diagrams illustrating example methods for providing secure profiles on an embedded subscriber identification module (eSIM), according to some embodiments.

DETAILED DESCRIPTION OF EXAMPLE EMBODIMENTS

Figure 1:
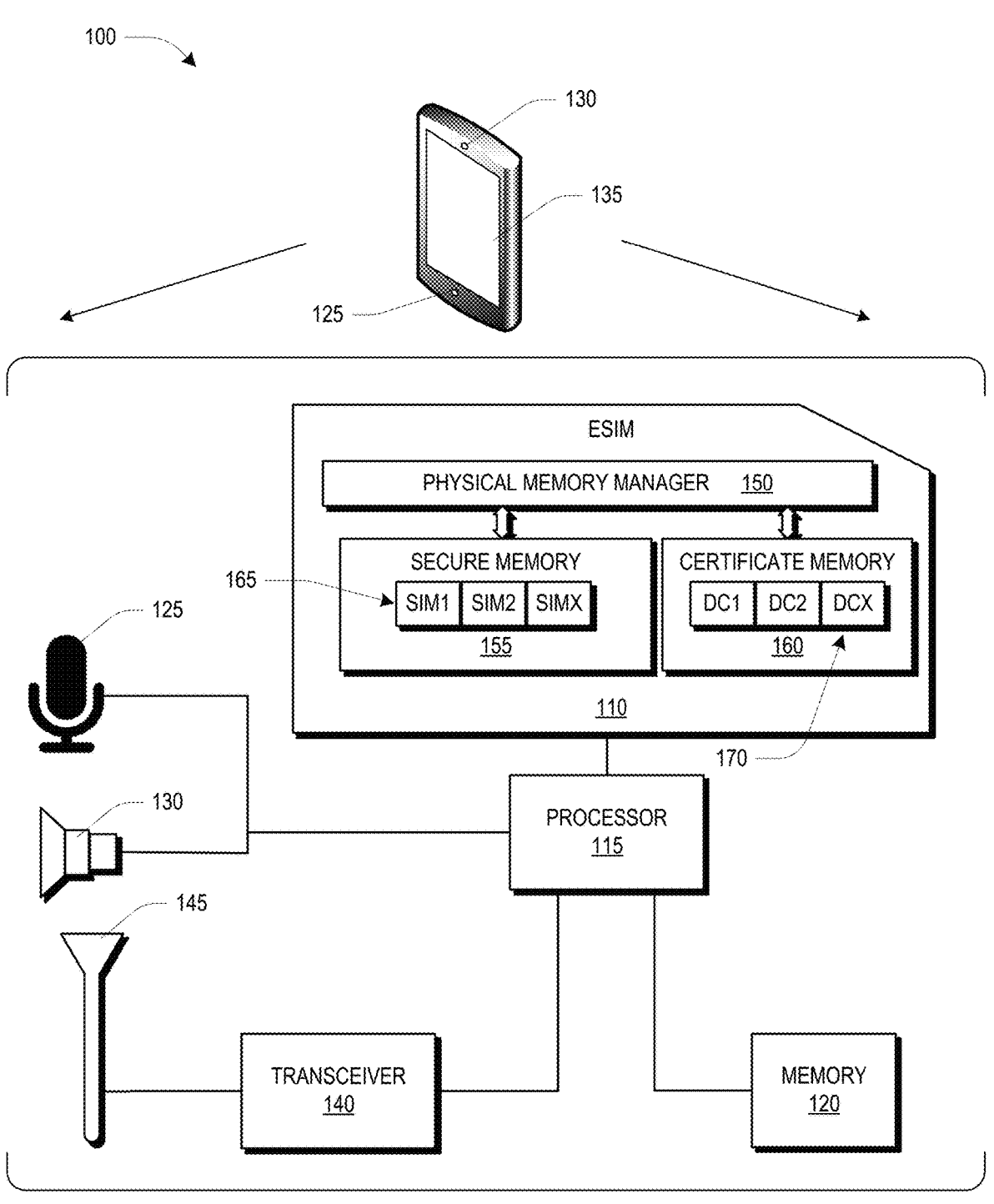
FIG. 1 is a diagram of a communication system, according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

According to some embodiments, a device includes a processor, and an embedded subscriber identification module (eSIM). The eSIM includes a secure memory, and a physical memory manager configured to receive a first request to load a first profile for accessing a first mobile network in the secure memory from a first mobile network operator, and responsive to authenticating the first request, create a first partition in the secure memory associated with the first mobile network operator, store in the first partition the first profile, and limit access to the first partition to the first mobile network operator.

According to some embodiments, a method for securing profiles in an embedded subscriber identification module (eSIM) includes receiving from a first mobile network operator a first request to load in a secure memory of a device a first profile for accessing a first mobile network using a transceiver of the device, responsive to authenticating the first request, creating a first partition in the secure memory associated with the first mobile network operator and storing the first profile in the first partition, and limiting access to the first partition to the first mobile network operator.

According to some embodiments a device includes a transceiver and an embedded subscriber identification module (eSIM). The eSIM includes a secure memory including a first partition storing a first profile associated with a first mobile network operator for accessing a first mobile network using the transceiver and a second partition storing a second profile associated with a second mobile network operator for accessing a second mobile network using the transceiver. The eSIM includes a physical memory manager configured to limit access to the first partition to the first mobile network operator and limit access to the second partition to the second mobile network operator.

A traditional subscriber identification module (SIM), commonly referred to as a SIM card, is used to securely store information for identifying and authenticating a subscriber on a wireless network associated with a particular mobile network operator (MNO). Accordingly, the traditional SIM card is owned and issued by a specific MNO. For example, an end user may establish a service contract with an MNO and receive a SIM card that can be inserted into an electronic device, and the SIM card may contain subscription credentials issued and authenticated by the MNO such that the electronic device can connect to the wireless network associated with the MNO using the subscription credentials stored on the SIM card.

Similar to the traditional SIM, a computing module called an embedded SIM (eSIM) has been developed to control authentication and service access for next generation electronic devices, including machine-to-machine (M2M) devices that may operate without end user interaction (e.g., smart meters, light bulbs, appliances, and/or the like) and consumer devices managed by end users (e.g., smart phones, smart watches, wearables, connected cars, and/or the like). However, unlike a traditional SIM, an eSIM is remotely programmable and has a capability to accommodate multiple SIM profiles, each of which may include MNO and subscriber data that would otherwise be stored on a traditional SIM card. For example, the eSIM may be implemented as an embedded Universal Integrated Circuit Card (eUICC) that stores MNO SIM profiles and provides the ability to remotely manage the MNO SIM profiles over-the-air (OTA) through a process called remote SIM provisioning (RSP).

For example, the RSP process may utilize a server-driven push model and/or a client-driven pull model in which an electronic device with an eUICC or eSIM is connected to an RSP platform associated with a particular MNO. The RSP platform may remotely provision the electronic device with a SIM profile that includes data related to a subscription with the particular MNO (e.g., an International Mobile Subscriber Identity (IMSI), an Integrated Circuit Card Identifier (ICCID), security algorithms, and/or the like). To subsequently change to a new MNO, the electronic device may connect to the RSP platform associated with the new MNO and download a new SIM profile that includes data related to a subscription with the new MNO.

Accordingly, eUICC or eSIM technology is being increasingly deployed by device manufacturers due to the flexibility, whereby a device having an eUICC can connect to the RSP platform for any MNO to download a suitable SIM profile to onboard live data service for the device. Furthermore, in addition to providing the flexibility to choose any MNO without having to swap out a SIM card, eUICC technology addresses challenges that may arise with respect to changing SIM cards in M2M or Internet of Things (IoT) devices that may be remotely located, hermetically sealed, and/or the like.

FIG. 1 is a diagram of a communication device 100, according to some embodiments. The communication device 100 may include, among other things, an embedded subscriber identification module (eSIM) 110, a processor 115, a memory 120, a microphone 125, a speaker 130, a display 135, a transceiver 140, and an antenna 145. The memory 120 may be a volatile memory (e.g., DRAM, SRAM) or a non-volatile memory (e.g., ROM, flash memory, hard disk, etc.). In some embodiments, the transceiver 140 transmits and receives signals via the antenna 145. The transceiver 140 may include one or more radios for communicating according to different radio access technologies, such as cellular, Wi-Fi, BLUETOOTH®, Zigbee, etc. In the communication device 100, the processor 115 may execute instructions stored in the memory 120 and store information in the memory 120, such as the results of the executed instructions. The transceiver 140 may also communicate over a packet-based communication network, such as the Internet. Other structures and/or configurations of the communication device 100 are within the scope of the present disclosure.

In some embodiments, the eSIM 110 includes a physical memory manager 150 for managing a secure memory 155 for storing SIM data and a certificate memory 160 for storing credentials for MNOs that may have associated SIM profiles in the secure memory 155. Although the secure memory 155 and the certificate memory 160 are illustrated as being distinct, the certificate memory 160 may be a predetermined region of the secure memory 155 rather than a separate memory. In some embodiments, the physical memory manager 150 divides the secure memory 155 into partitions 165 to allow individual SIM profiles to be stored in different partitions 165. The physical memory manager 150 stored digital certificates 170 in the certificate memory 160 for various MNOs. In some embodiments, the digital certificates 170 correspond to the SIM profiles in the partitions 165. For example, DC1 corresponds to SIM1, DC2 corresponds to SIM2, and DCX corresponds to SIMX. In some embodiments, the certificate memory 160 is preloaded with digital certificates 170 for various MNOs regardless of whether any SIM profiles are stored in the partitions 165. When a SIM profile is stored in a partition 165 the physical memory manager 150 links the associated digital certificate to the partition 165 in which the SIM profile is stored.

In some embodiments, a SIM profile includes data related to a subscription with a particular MNO (e.g., an International Mobile Subscriber Identity (IMSI), an Integrated Circuit Card Identifier (ICCID), security algorithms, and/or the like). During operation of the communication device 100, one of the SIM profiles is designated as an active SIM profile for communicating over a communication network operated by the associated MNO using the transceiver 140 and the antenna 145. The physical memory manager 150 controls access to the secure memory 155 to allow the MNO to provide credentials and access the partition 165 storing the active SIM profile, while blocking access to the other partitions 165.

In some embodiments, a digital certificate 170 associated with a particular MNO includes various fields, such as a serial number assigned to the digital certificate, a signature algorithm identifying a cryptographic algorithm that a certificate authority used to sign the digital certificate, an identifier for the certificate authority, a validity period for the digital certificate (e.g., a date and/or time when the digital certificate becomes valid, a date and/or time when the digital certificate expires, and/or the like), information about an MNO to which the digital certificate was issued, a public key issued to the digital certificate subject, and/or other parameters.

Figure 2B:
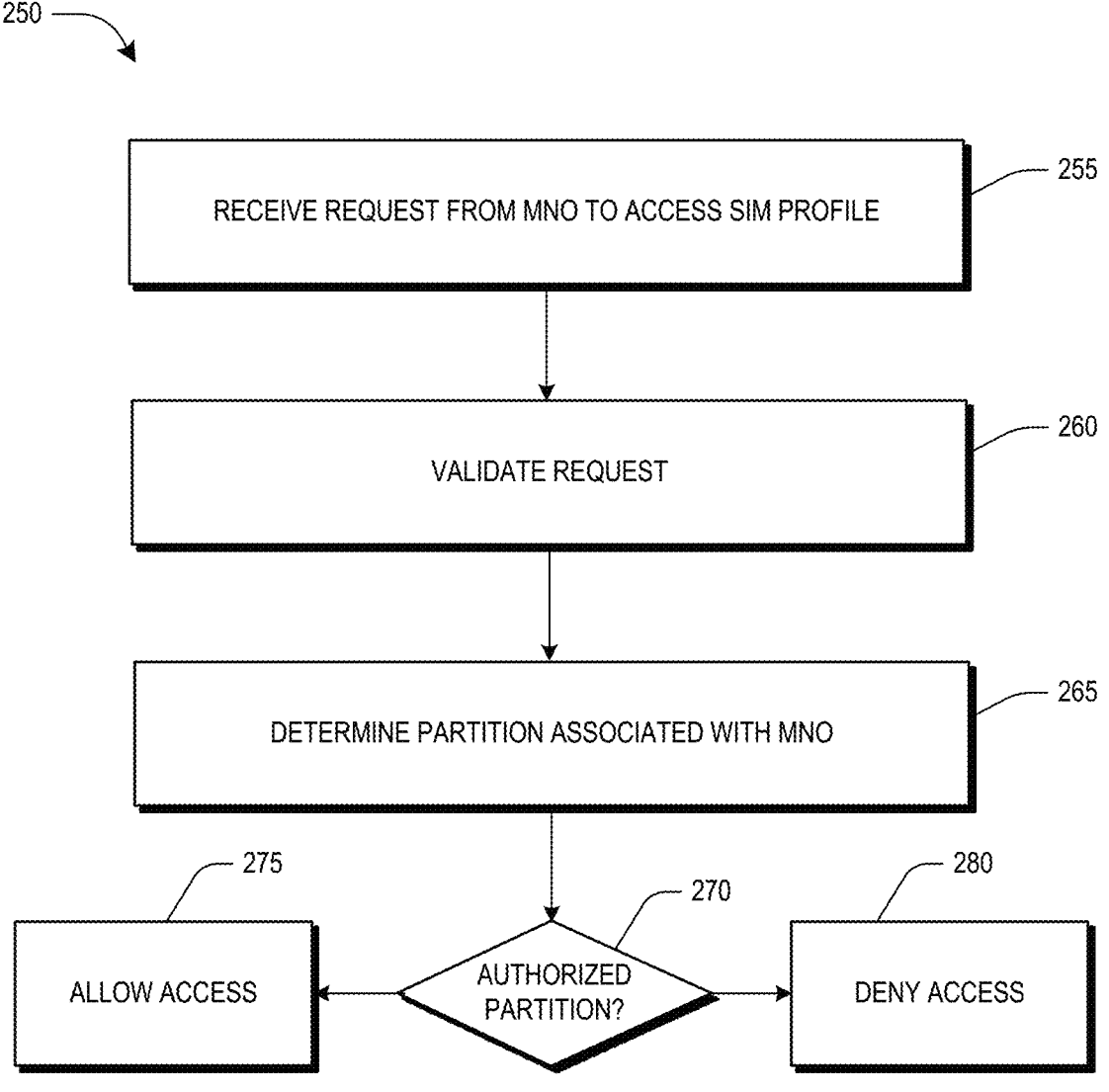
Figure 3A:
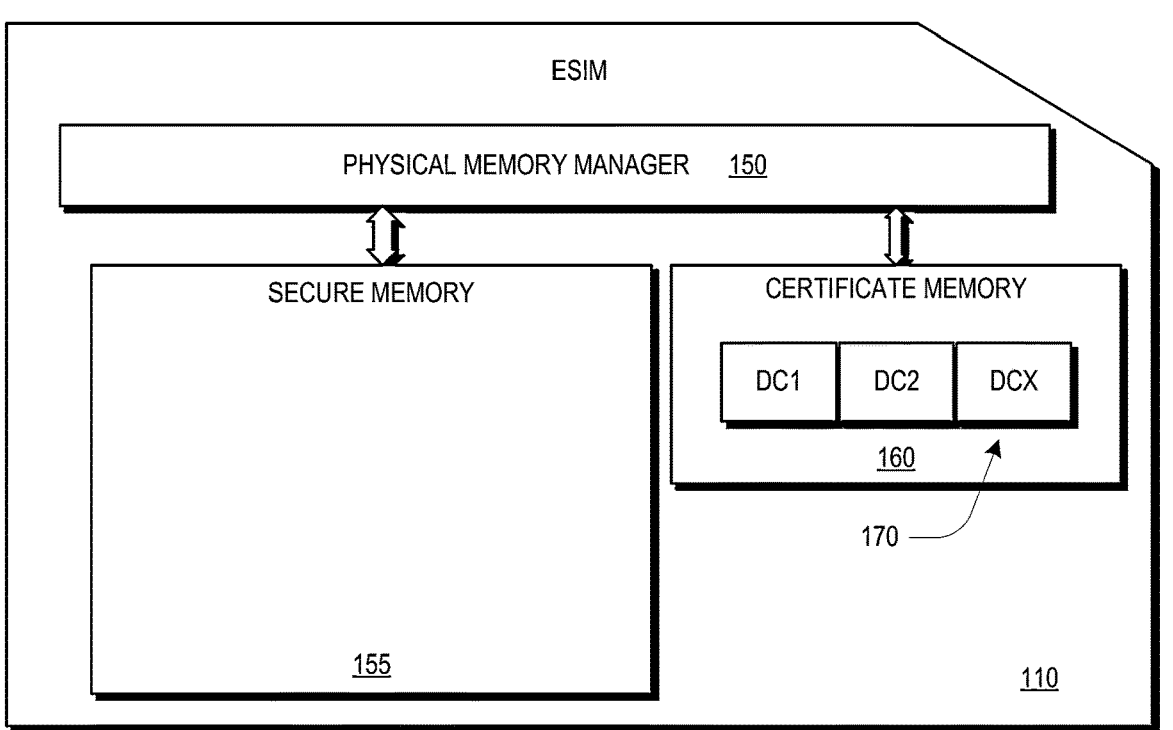
FIGS. 3A-3D illustrate eSIM configurations during operation of at least some methods provided herein, according to some embodiments.

FIGS. 2A and 2B are flow diagrams illustrating example methods 200, 250 for providing secure profiles on an eSIM 110, according to some embodiments. FIGS. 3A-3D illustrate eSIM configurations during operation of the methods 200, 250 according to some embodiments. Referring to FIG. 2A, at 205, digital certificates 170 for MNOs are loaded in the certificate memory 160. For example, digital certificates 170 for known MNOs in the region where the communications device 100 is intended to be sold may be loaded by the device manufacturer. In another example, during configuration of the communications device 100 a user may select MNOs for inclusion in the certificate memory 160. In another example, the certificate memory 160 may be blank and when a MNO sells the communication device 100, the digital certificate 170 may be loaded into the certificate memory 160. Referring to FIG. 3A, the secure memory 155 may be blank, and the certificate memory 160 may be loaded with one or more digital certificates 170.

At 210 a request from an MNO to load a SIM profile is received by the communication device 100. The request may be received by the processor 115 and sent to the physical memory manager 150. The request includes credentials from the MNO.

At 215, the physical memory manager 150 attempts to validate the request based on the credentials of the MNO. In some embodiments, the physical memory manager 150 determines if a digital certificate 170 for the MNO is present in the certificate memory 160. If there is no corresponding digital certificate 170, the physical memory manager 150 may request the processor 115 to contact an external registration authority to request a digital certificate and store the retrieved digital certificate in the certificate memory 160. In some embodiments, the credentials from the MNO may include a public key. The physical memory manager 150 may use the digital certificate 170 (e.g., DC1) to verify that the public key is associated with the MNO. If the request fails validation, the physical memory manager 150 may report an error condition to the processor 115.

Figure 3B:
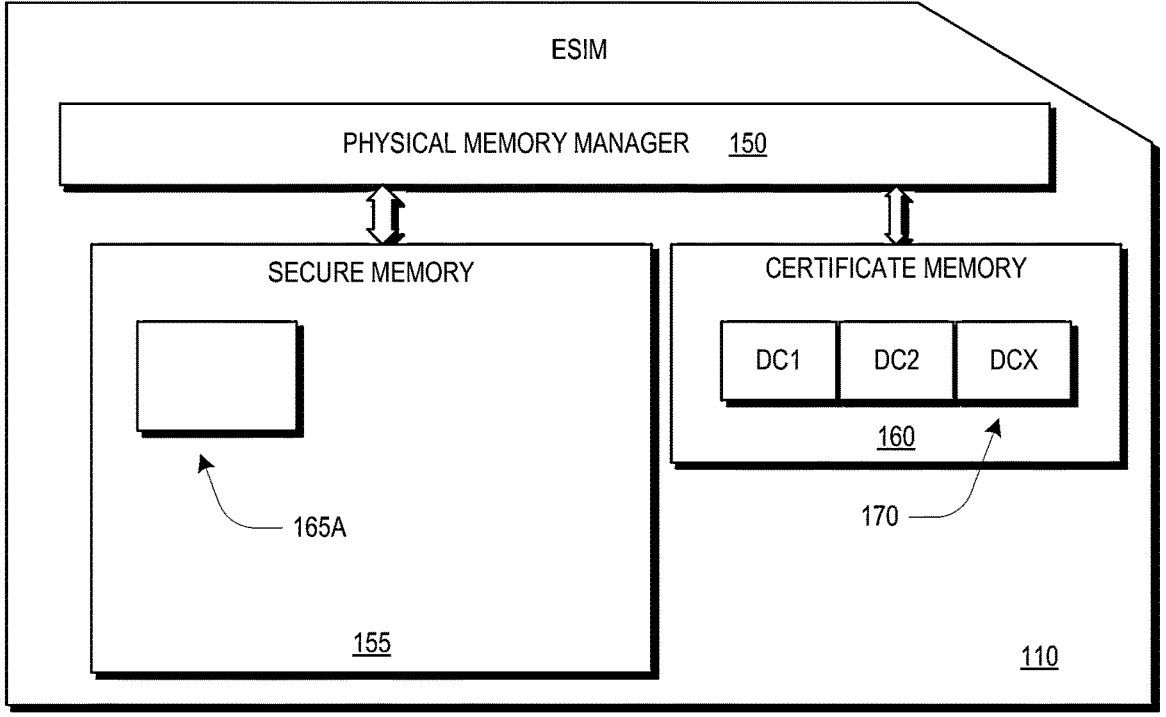

At 220, the physical memory manager 150 creates a partition 165A for the MNO responsive to validating the request, as shown in FIG. 3B. In some embodiments, the partition 165A is set up using public key infrastructure (PKI) techniques, where the partition 165A is encrypted using the public key of the MNO so that other entities may not see the contents of the partition 165A.

Figure 3C:
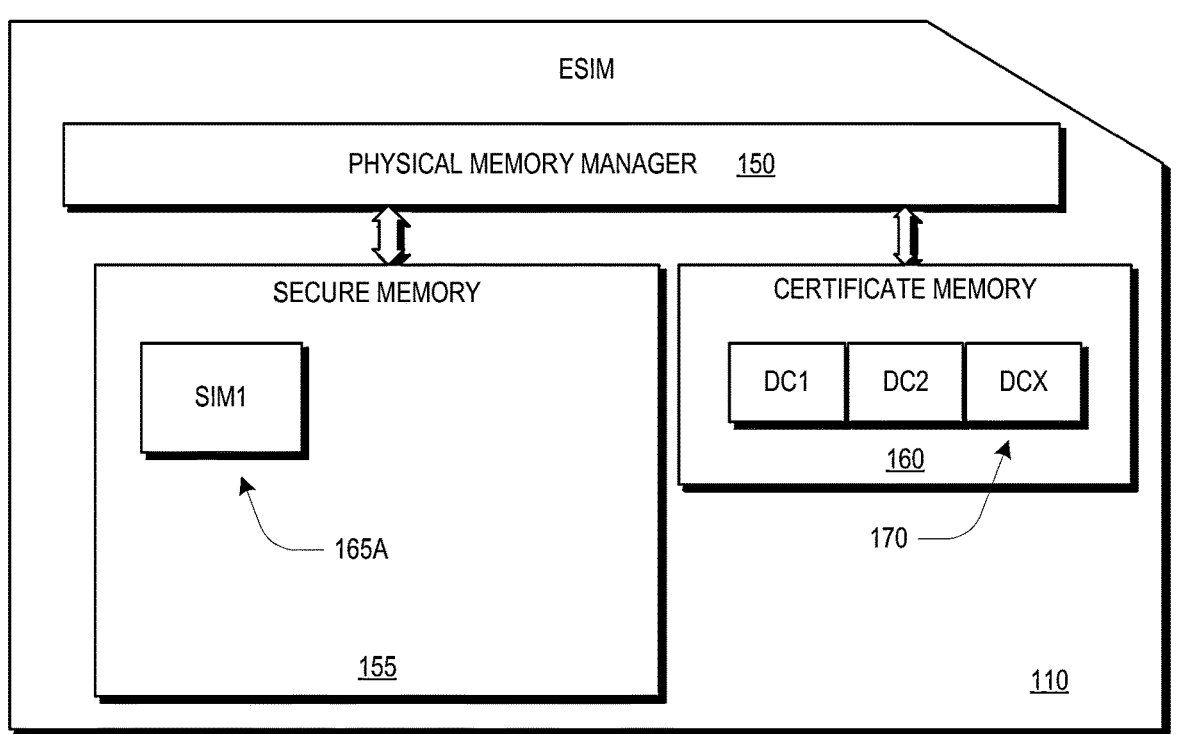

At 225, the physical memory manager 150 loads the SIM profile from the MNO (e.g., SIM1) into the partition 165A, as illustrated in FIG. 3C.

Figure 3D:
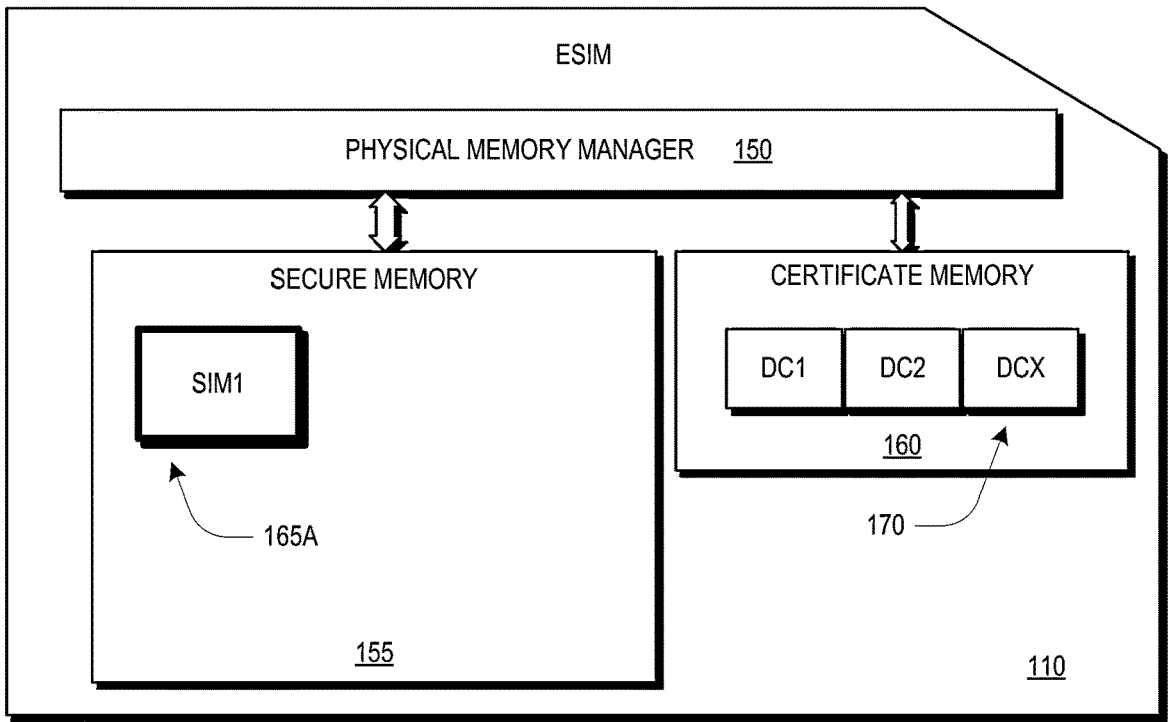

At 230, the physical memory manager 150 designates an active SIM profile, as illustrated in FIG. 3D by the bold box around SIM1 in the partition 165A.

Figure 3E:
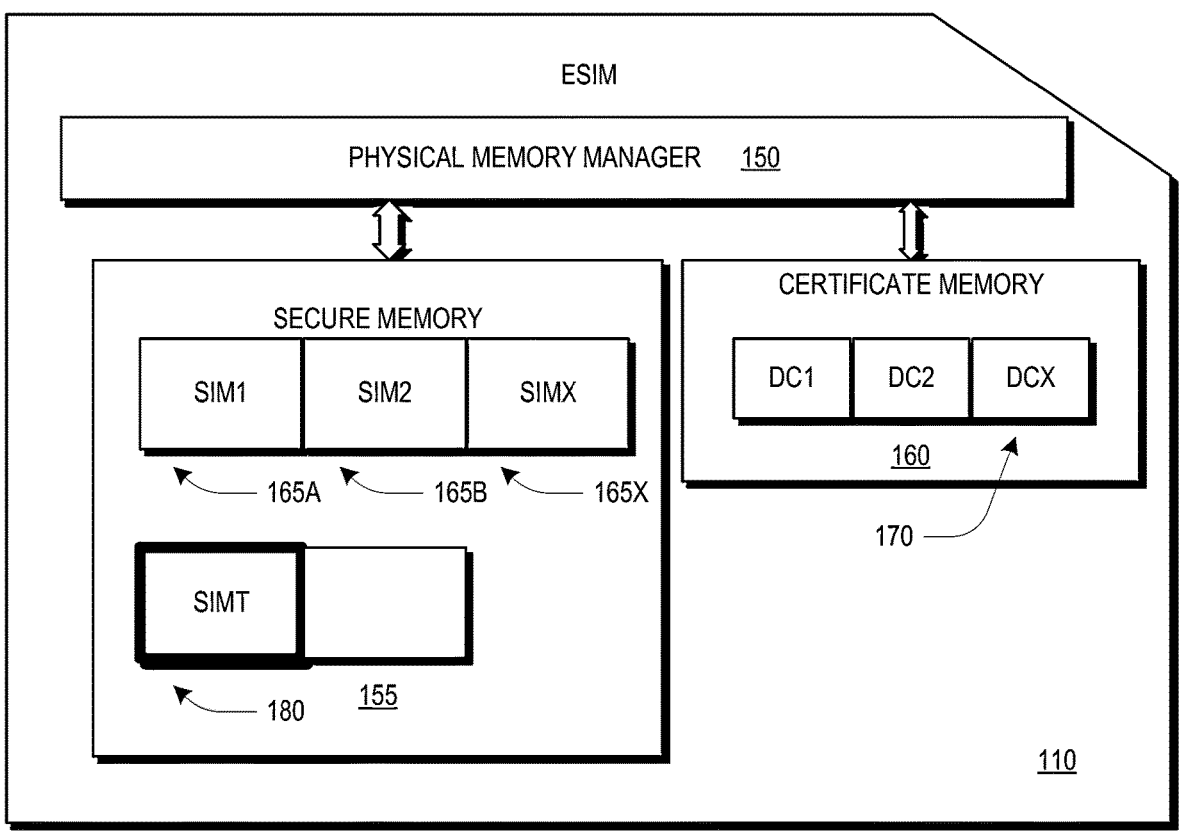
FIG. 3E illustrates a temporary partition in secure memory, according to some embodiments.

Portions of the method 200 may be repeated if the user of the communication device adds different accounts with different MNOs. As illustrated in FIG. 3E, additional partitions 165B, 165C containing SIM profiles (e.g., SIM2, SIMX) may be created for other MNOs using the authentication and portioning described above. The user may designate any of the SIM profiles as the active SIM profile, such as SIM2.

Referring to FIG. 3E, the secure memory 155 may include temporary partitions 180, according to some embodiments. In some embodiments, the partitions 165 are intended to be permanent once they are created and loaded with SIM profiles. Hence, once a SIM profile is loaded into a partition 165, the partition 1654 is locked and the SIM profile cannot be changed, deleted, or replaced. To provide flexibility for temporary MNO relationships, such as for roaming or international travel, one of the temporary partitions 180 may be loaded with a temporary SIM profile, SIMT, and activated. The MNO associated with the temporary SIM profile may be authenticated using a digital certificate 170, which may be retrieved from an external registration authority. After the termination of services with the temporary MNO (i.e., after roaming or travel is complete), the temporary partition 180 may be erased.

FIG. 2B illustrates a method 250 for securing the partitions 165, according to some embodiments. At 255, a request is received by the physical memory manager 150 to access a SIM profile. The request may include credentials for the MNO requesting access to the SIM profile. At 260, the physical memory manager 150 validates the request. In some embodiments, the physical memory manager 150 uses a public key in a digital certificate 170 to validate the credentials in the request. At 265, the physical memory manager 150 determines the partition 165 assigned to the MNO associated with the request. If the partition 165 is authorized for access by the MNO at 270, the physical memory manager 150 allows the access at 275. If the partition 165 is not authorized for access by the MNO at 270, the physical memory manager 150 denies the access at 280.

Providing security for the partitions 165 in the eSIM 110 allows different MNOs to securely store SIM profiles than cannot be accessed by other entities. PKI techniques may be used for authenticating MNOs and encrypting data in the eSIM 110.

Figure 4:
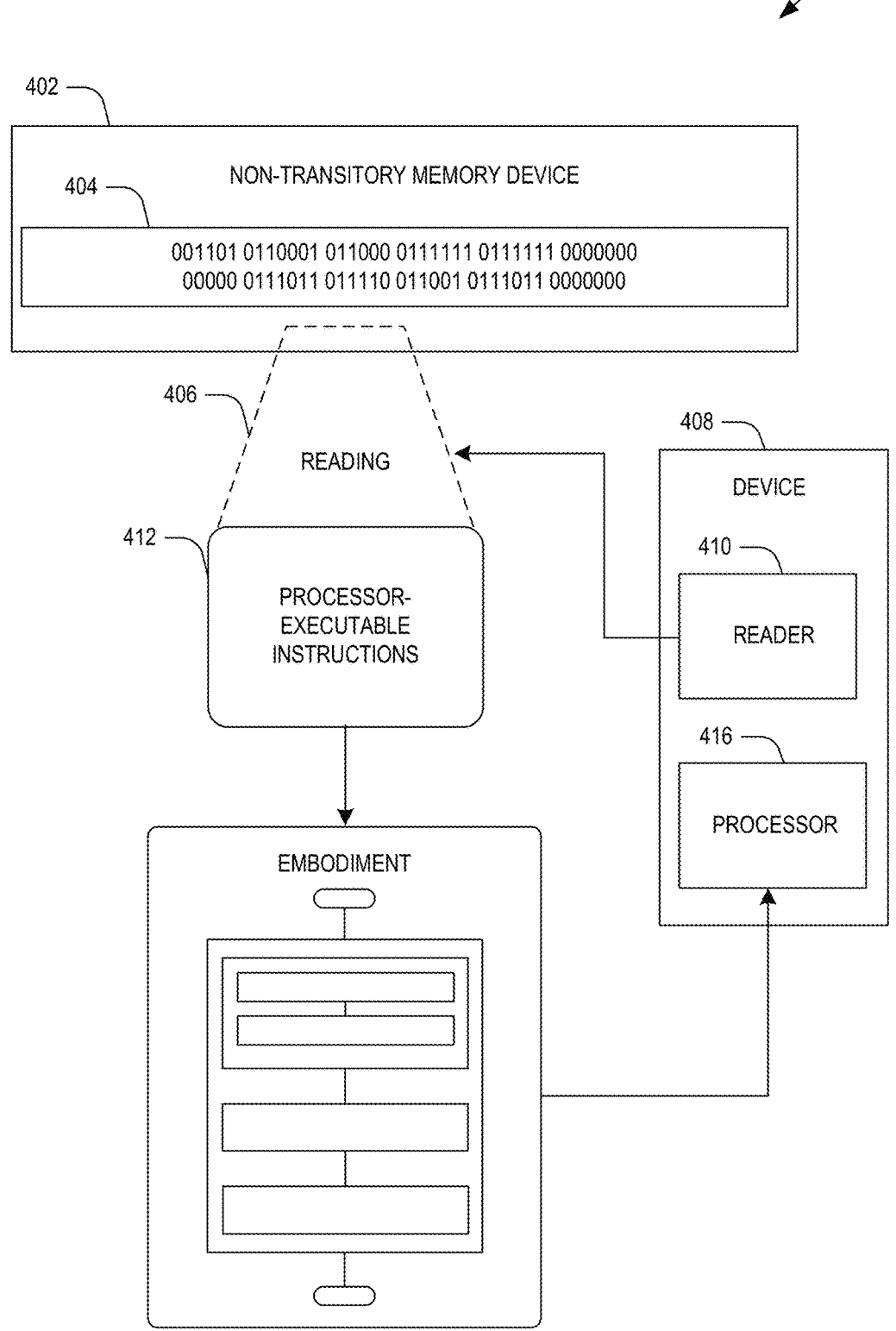
FIG. 4 is an illustration of a scenario featuring an example non-transitory machine readable medium, according to some embodiments.

FIG. 4 is an illustration of a scenario 400 involving an example non-transitory machine-readable medium 402. The non-transitory machine readable medium 402 may comprise processor-executable instructions 412 that when executed by a processor 416 cause performance (e.g., by the processor 416) of at least some of the provisions herein. The non-transitory machine readable medium 402 may comprise a memory semiconductor device (e.g., a semiconductor device utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 402 stores machine-readable data 404 that, when subjected to reading 406 by a reader 410 of a device 408 (e.g., a read head of a hard disk drive, or a read operation invoked on a solid-state storage device), express the processor-executable instructions 412. In some embodiments, the processor-executable instructions 412, when executed cause performance of operations, such as at least some of the example methods 200, 250 of FIGS. 2A and 2B, for example. In some embodiments, the processor-executable instructions 412 are configured to cause implementation of a system.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" and/or the like is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:

a processor; and an embedded subscriber identification module (eSIM), comprising:

a secure memory; and a physical memory manager configured to:

receive a first request, to load a first profile for accessing a first mobile network in the secure memory of the eSIM, from a first mobile network operator, and responsive to authenticating the first request:

create a first partition, in the secure memory of the eSIM, associated with the first mobile network operator;

store, in the first partition in the eSIM, the first profile; and limit access to the first partition in the eSIM to the first mobile network operator so that one or more other mobile network operators cannot access the first partition in the eSIM.

2. The device of claim 1, wherein:

the first request comprises a first credential associated with the first mobile network operator;

the eSIM comprises a certificate memory configured to store a first digital certificate associated with the first mobile network operator; and the physical memory manager is configured to authenticate the first request based on the first credential and the first digital certificate.

3. The device of claim 2, wherein the certificate memory comprises a region of the secure memory.

4. The device of claim 1, wherein:

the physical memory manager is configured to:

receive a second request to load a second profile for accessing a second mobile network in the secure memory from a second mobile network operator, and responsive to authenticating the second request:

create a second partition in the secure memory associated with the second mobile network operator;

store in the second partition the second profile; and limit access to the second partition to the second mobile network operator.

5. The device of claim 4, wherein:

the physical memory manager is configured to designate one of the first profile or the second profile as an active profile.

6. The device of claim 1, wherein:

the secure memory comprises a temporary partition, and the physical memory manager is configured to:

receive a second request from a second mobile network operator to load in the secure memory a temporary profile for accessing a second mobile network, and responsive to authenticating the second request:

store in the temporary partition the temporary profile, and erase the temporary profile after termination of services with the second mobile network operator.

7. A device, comprising:

a processor; and an embedded subscriber identification module (eSIM), comprising:

a secure memory; and a physical memory manager configured to;

receive a first request, to load a first profile for accessing a first mobile network in the secure memory of the eSIM, from a first mobile network operator, responsive to authenticating the first request:

create a first partition, in the secure memory of the eSIM, associated with the first mobile network operator;

store, in the first partition in the eSIM, the first profile; and limit access to the first partition in the eSIM to the first mobile network operator, receive a second request to access the first profile in the first partition, authenticate the second request using a credential in the second request, and responsive to determining that the second request corresponds to the first mobile network operator, allow the second request.

8. The device of claim 7, wherein:
the physical memory manager is configured to deny the second request responsive to determining that the second request does not correspond to the first mobile network operator.

9. A device, comprising:
a processor; and
an embedded subscriber identification module (eSIM), comprising:
  a secure memory; and
  a physical memory manager configured to:
    receive a first request, to load a first profile for accessing a first mobile network in the secure memory of the eSIM, from a first mobile network operator, and
    responsive to authenticating the first request:
      create a first partition, in the secure memory of the eSIM, associated with the first mobile network operator;
      store, in the first partition in the eSIM, the first profile;
      lock the first partition after storing in the first partition the first profile; and
      limit access to the first partition in the eSIM to the first mobile network operator.

10. A method for securing profiles in an embedded subscriber identification module (eSIM), comprising:
receiving, from a first mobile network operator, a first request to load, in a secure memory of a device, a first profile for accessing a first mobile network using a transceiver of the device;
responsive to authenticating the first request, creating a first partition, in the secure memory, associated with the first mobile network operator;
storing the first profile in the first partition;
limiting access to the first partition to the first mobile network operator;
receiving a second request, from a second mobile network operator, to load a temporary profile for accessing a second mobile network using the transceiver;
responsive to authenticating the second request, storing the temporary profile in a temporary partition in the secure memory; and
erasing the temporary profile after termination of services with the second mobile network operator.

11. The method of claim 10, comprising:
storing a first digital certificate associated with the first mobile network operator in a certificate memory; and
authenticating the first request based on the first digital certificate and a first credential in the first request associated with the first mobile network operator.

12. The method of claim 10, comprising:
receiving from a third mobile network operator a third request to load in the secure memory a second profile for accessing a third mobile network using the transceiver;
responsive to authenticating the third request, creating a second partition in the secure memory associated with the third mobile network operator and storing the second profile in the second partition; and
limiting access to the second partition to the third mobile network operator.

13. The method of claim 12, comprising:
designating one of the first profile or the second profile as an active profile.

14. The method of claim 10, comprising:
receiving a third request from an entity to access the first profile in the first partition; wherein:
  limiting access to the first partition to the first mobile network operator comprises:
    authenticating the entity using a credential in the third request; and
    responsive to determining that the entity corresponds to the first mobile network operator, allowing the third request.

15. The method of claim 14, wherein limiting access to the first partition to the first mobile network operator comprises:
denying the third request responsive to determining that the entity does not correspond to the first mobile network operator.

16. A device, comprising:
a transceiver; and
an embedded subscriber identification module (eSIM), comprising:
  a secure memory comprising:
    a temporary partition;
    a first partition storing a first profile, associated with a first mobile network operator, for accessing a first mobile network using the transceiver, and
    a second partition storing a second profile, associated with a second mobile network operator, for accessing a second mobile network using the transceiver; and
  a physical memory manager configured to:
    limit access to the first partition to the first mobile network operator,
    limit access to the second partition to the second mobile network operator,
    receive a request from a third mobile network operator to load, in the secure memory, a temporary profile for accessing a third mobile network using the transceiver, and
    responsive to authenticating the request:
      store, in the temporary partition, the second profile; and
      erase the temporary profile after termination of services with the third mobile network operator.

17. The device of claim 16, comprising:
a certificate memory configured to store a first digital certificate associated with the first mobile network operator and a second digital certificate associated with the second mobile network operator, wherein:
  the physical memory manager is configured to:
    authenticate requests from the first mobile network operator based on a first credential provided by the first mobile network operator and the first digital certificate, and
    authenticate requests from the second mobile network operator based on a second credential provided by the second mobile network operator and the second digital certificate.

18. The device of claim 16, wherein:
the physical memory manager is configured to designate one of the first profile or the second profile as an active profile.

19. The device of claim 16, wherein:
the physical memory manager is configured to:
  receive a second request to access the first profile in the first partition, and deny the second request responsive to determining that the second request does not correspond to the first mobile network operator.

20. The device of claim 16, comprising:

a certificate memory configured to store at least one of a first digital certificate associated with the first mobile network operator or a second digital certificate associated with the second mobile network operator.

\* \* \* \* \*